(No Model.)
I. N. COOL.
VEHICLE TOP.
No. 485,610. Patented Nov. 8, 1892.
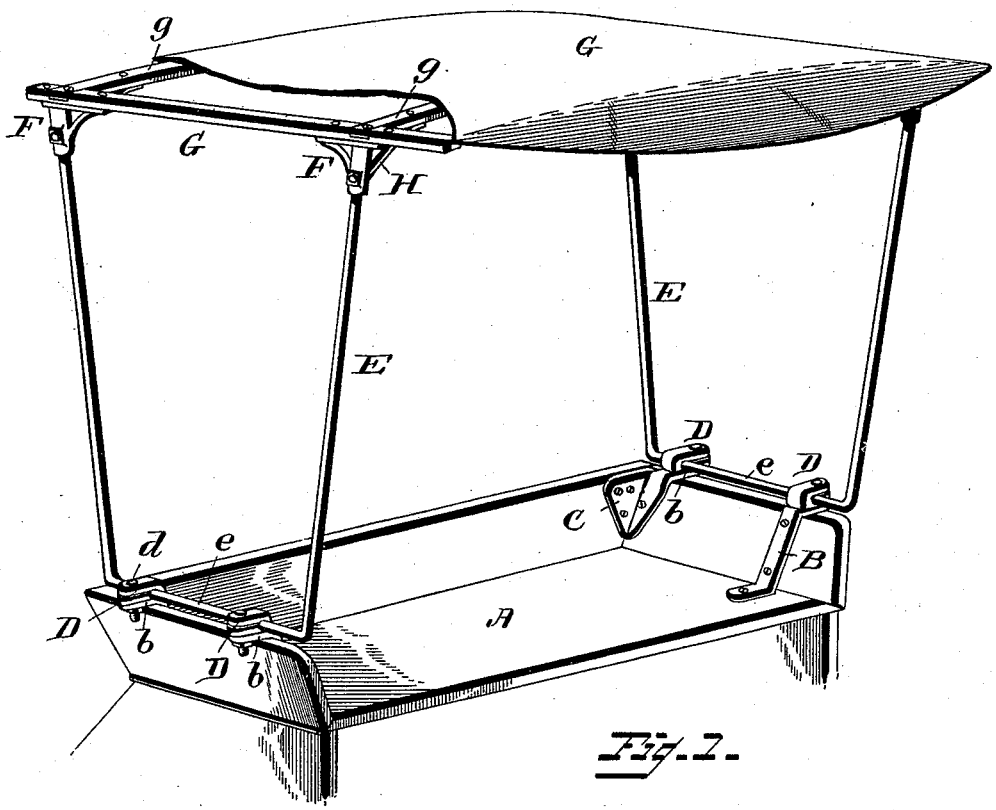
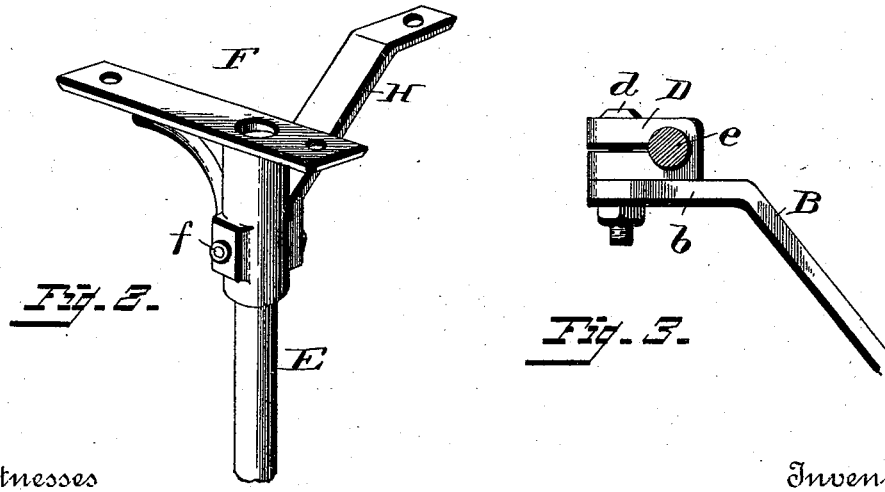
Witnesses
Albert Speiden
Van Buren Hillyard
Inventor
Isaac N. Cool,
By his Attorneys
R. S. & A. P. Lacey

UNITED STATES PATENT OFFICE.

ISAAC N. COOL, OF AUBURN, INDIANA.

VEHICLE-TOP.

SPECIFICATION forming part of Letters Patent No. 485,610, dated November 8, 1892.

Application filed March 5, 1892. Serial No. 423,908. (No model.)

*To all whom it may concern:*

Be it known that I, ISAAC N. COOL, a citizen of the United States, residing at Auburn, in the county of De Kalb and State of Indiana, have invented certain new and useful Improvements in Vehicle-Tops; and I do hereby declare the following to be a full, clear, and exact description of the invention, such as will enable others skilled in the art to which it appertains to make and use the same.

This invention relates to canopy or vehicle-top supports, and has for its objects to provide supports which can be adjusted to different-sized vehicles within certain limits and which will admit of the top being shifted to the front or the rear at will.

The improvement consists of the novel features and the peculiar construction and combination of the parts, which will be hereinafter more fully described and claimed, and which are shown in the annexed drawings, in which—

Figure 1 is a perspective view of a vehicle-seat having the invention applied thereto, part of the top being broken away to show the relative disposition of the parts. Fig. 2 is a detail view of the upper end of the support, showing the bracket and the brace applied thereto. Fig. 3 is a detail view of the clutch, showing the bolt which secures it to the seat-iron and which clamps the horizontal portion of the support therein.

The seat A, of usual construction, is strengthened by the irons B and C, which have a horizontal portion b, that is designed to extend over the upper edge of the sides of the seat and receive the clutches D, that are held thereto by a bolt d. These clutches have a horizontal opening to receive the horizontal portion e of the canopy-support E, which is provided with a slot which extends from the said opening through one side. The separated ends of the clutch stand sufficiently far apart to permit the horizontal portion of the said support E to be clamped securely therein by tightening the bolt d.

The supports E are approximately U-shaped and are provided at their upper ends with brackets F, the latter being socketed at their lower ends and slipped on the upper ends of the vertical members of the said supports and held thereon by bolts f. The side bars of the canopy or top frame G are bolted to the brackets F. The braces H, extending across the angle formed between the brackets F and the cross-bars g, are secured to the latter at their upper ends and to the brackets F at their lower ends by the same bolts f which secure the said brackets to the supports E.

The seat-irons B and C are disposed near the front and the rear edges of the seat, respectively, and the horizontal portion e of the supports is longer than the distance between the said irons to permit the said supports to be shifted to the front or the rear of the vehicle, as required. The clutches admit of the supports being properly adjusted, and when clamped to the said support hold the latter firmly and secure it and the clutches to the seat-irons.

Having thus described my invention, what I claim, and desire to secure by Letters Patent, is—

1. The combination, with the irons B and C, having horizontal portions, a canopy, and approximately-U-shaped supports, of clutches embracing the horizontal portions of the said supports and bolts for securing the clutches to the horizontal portions of the said irons and clamping the said supports therein, substantially as described.

2. The combination of the seat, the irons B and C, having horizontal portions, the clutches D, the approximately-U-shaped supports adapted to be shifted longitudinally in the said clutches, bolts to clamp the supports in the clutches and secure the latter to the irons B and C, and the canopy attached to the said supports, substantially as described.

3. The combination, with the canopy-frame and the supports, of brackets fitted on the upper ends of the said supports and secured to the side bars thereof, and braces extending across the angle between the said supports and the cross-bars of the canopy-frame and secured at their upper ends to the said cross-bars and fastened at their lower ends to the brackets by the same bolts which secure the brackets to the said supports, substantially as set forth.

ISAAC N. COOL.

Witnesses:
LAFAYETTE J. MILLER,
JOHN W. BAXTER.